ized Patent No.: US 9,796,326 B2

(12) United States Patent
Nordstrom et al.

(10) Patent No.: US 9,796,326 B2
(45) Date of Patent: Oct. 24, 2017

(54) SYSTEMS AND METHODS FOR VEHICLE HAZARD LIGHT CONTROL WITH SELECTABLE LIGHTING PATTERNS

(71) Applicant: GM GLOBAL TECHNOLOGY OPERATIONS LLC, Detroit, MI (US)

(72) Inventors: Erik C. Nordstrom, Bloomfield Hills, MI (US); Kris S. Sevel, Rochester Hills, MI (US); Stephen M. Cichy, Lapeer, MI (US); Ryan A. Church, Oxford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/455,065

(22) Filed: Aug. 8, 2014

(65) Prior Publication Data

US 2016/0039336 A1 Feb. 11, 2016

(51) Int. Cl.
*G08B 21/00* (2006.01)
*B60Q 1/46* (2006.01)
*B60Q 1/34* (2006.01)

(52) U.S. Cl.
CPC ............... *B60Q 1/46* (2013.01); *B60Q 1/343* (2013.01)

(58) Field of Classification Search
CPC ........................................................ B60Q 1/46
USPC ........ 340/463, 464, 468, 469, 471, 475, 478
See application file for complete search history.

(56) References Cited

U.S. PATENT DOCUMENTS

| | | | | |
|---|---|---|---|---|
| 3,925,759 A | * | 12/1975 | Lucas | B60Q 1/52 340/471 |
| 4,556,862 A | * | 12/1985 | Meinershagen | B60Q 1/26 340/466 |
| 8,552,852 B1 | * | 10/2013 | Hertz | B60P 3/40 340/468 |
| 2011/0156894 A1 | * | 6/2011 | Lin | B60Q 1/38 340/471 |

* cited by examiner

*Primary Examiner* — Jeffery Hofsass
(74) *Attorney, Agent, or Firm* — Lorenz & Kopf, LLP (57) ABSTRACT

A vehicle includes a plurality of lamps disposed on a rear portion of the vehicle, a user-actuatable hazard light control component (e.g. a turn-signal stalk) having a plurality of states, and a hazard lamp controller communicatively coupled to the plurality of lamps, the user-actuable hazard light control component, and the user-actuatable hazard light controller. The hazard lamp controller is configured to illuminate the plurality of lamps in accordance with a lighting pattern responsive to the state of the user-actuatable hazard light control component.

18 Claims, 6 Drawing Sheets

SYSTEMS AND METHODS FOR VEHICLE HAZARD LIGHT CONTROL WITH SELECTABLE LIGHTING PATTERNS

TECHNICAL FIELD

The technical field generally relates to automotive vehicles, and more particularly relates to the methods of controlling hazard light systems in such vehicles.

BACKGROUND

Automotive vehicles typically include some form of hazard light controller that, when activated by the user, causes lamps observable from behind the car (e.g., turn signal lamps and/or brake lamps) to enter a hazard indication mode—typically characterized by simultaneously flashing of the lamps at a uniform frequency.

Such hazard light systems are clearly useful, and are known to greatly increase the overall safety of motorists in situations where a vehicle is incapacitated on, for example, the shoulder of a roadway; nevertheless, there is still room for improvement in such systems, particularly with respect to providing motorists with additional, relevant information, such as whether a motorist approaching the vehicle from the rear should attempt to change lanes to the left or to the right. Unfortunately, providing such added functionality would traditionally require additional switches, knobs, controllers, software, and the like, unsatisfactorily increasing overall complexity of the vehicle and similarly increasing manufacturing costs.

Accordingly, it is desirable to provide improved systems and methods for activating and controlling hazard flash systems in automotive vehicles using user interface components already existing within the vehicle. Additional desirable features and characteristics of the present invention will become apparent from the subsequent detailed description and the appended claims, taken in conjunction with the accompanying drawings and the foregoing technical field and background.

SUMMARY

In accordance with one embodiment, a vehicle includes a plurality of lamps disposed on a rear portion of the vehicle, a user-actuatable hazard light control component having a plurality of states, and a hazard lamp controller communicatively coupled to the plurality of lamps, the user-actuable hazard light control component, and the user-actuatable hazard light controller, wherein the hazard lamp controller is configured to illuminate the plurality of lamps in accordance with a lighting pattern responsive to the state of the user-actuatable hazard light control component.

In accordance with another embodiment, a method for controlling hazard lighting for a vehicle comprises receiving a hazard activation signal; determining a selected state of a user-actuatable hazard light control component having a plurality of states; and illuminating, with a controller, a plurality of lamps disposed on a rear portion of the vehicle in accordance with a lighting pattern responsive to the state of the user-actuatable hazard light control component.

DESCRIPTION OF THE DRAWINGS

The exemplary embodiments will hereinafter be described in conjunction with the following drawing figures, wherein like numerals denote like elements, and wherein.

DETAILED DESCRIPTION

The subject matter described herein generally relates to an improved method for controlling hazard lamp lighting patterns (e.g., cascading lights to signal other drivers to move over a particular direction) utilizing user interface components (such as the turn signal stalk) that already exist within most vehicles. In this regard, the following detailed description is merely exemplary in nature and is not intended to limit the application and uses. Furthermore, there is no intention to be bound by any expressed or implied theory presented in the preceding technical field, background, brief summary or the following detailed description. As used herein, the term "module" refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
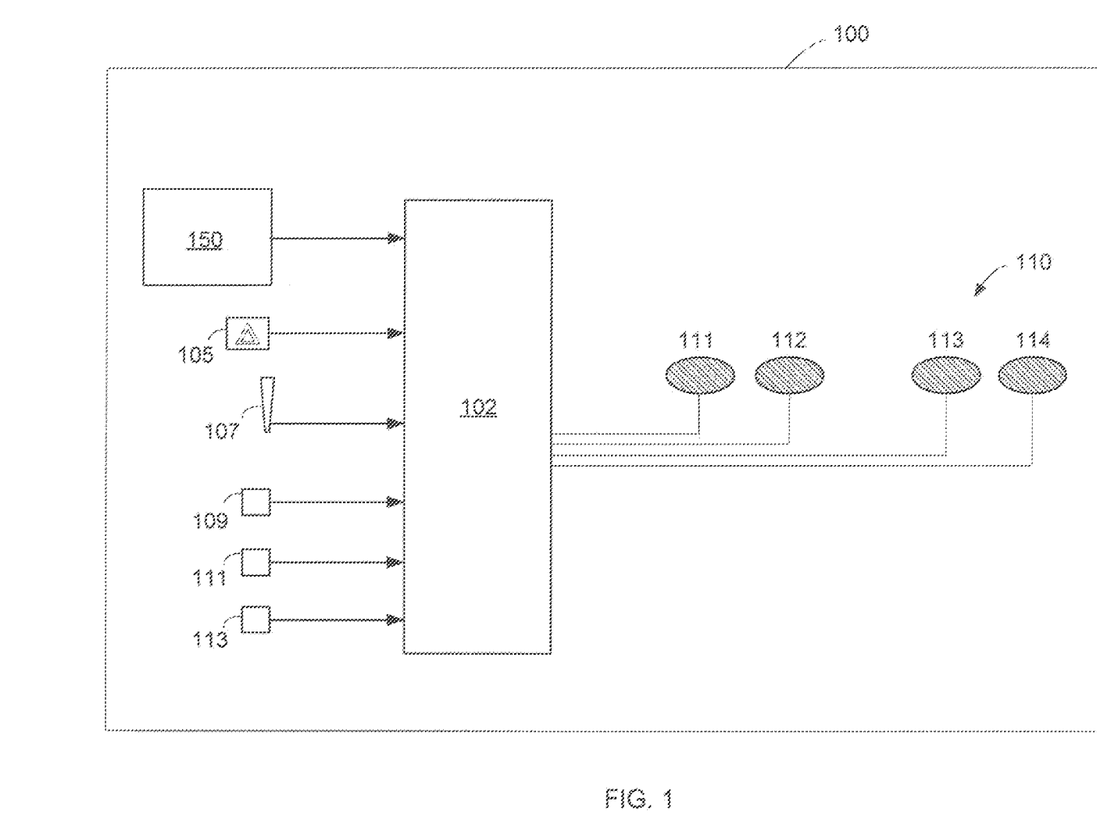
FIG. 1 is a conceptual block diagram of a vehicle with a hazard lamp control system in accordance with one embodiment.
Figure 2:
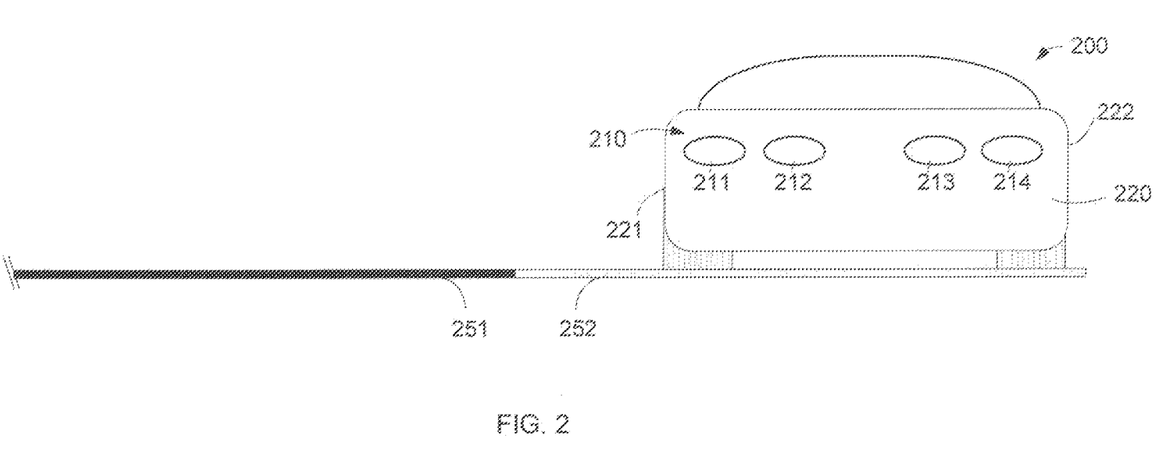
FIGS. 2 and 3 are rear views of a vehicle with a hazard lamp control system in accordance with one embodiment.

Referring now to FIG. 1, a vehicle 100 includes a plurality of lamps 110 (e.g., four lamps 111-114) disposed on a rear portion of the vehicle (e.g., as shown in FIG. 2), a hazard lamp controller 102 configured to accept a variety of inputs (150, 105, 107, 109, 111, and 113) as shown. More particularly, vehicle 100 includes a hazard light control component (e.g., 107) having a plurality of states (e.g., a conventional turn-signal stalk), and a hazard light activation component 105 (e.g., a switch, knob, or other such device configured to selectably activate hazard lamp controller 102). In general, as described in further detail below, hazard lamp controller 102 is configured to illuminate lamps 110 in accordance with a lighting pattern responsive to the state of the user-actuatable hazard light control component (or simply "component") 107. Lamps 110 may be any type of light-producing component now known or developed (e.g., incandescent, LED, and the like). Furthermore, while four lamps 110 are illustrated in FIG. 1, any number of rear lamps may present, depending upon the design of vehicle 100.

Hazard lamp controller (or simply "controller") 102 includes any suitable combination of hardware and/or software configured to perform the various functions described herein. In some embodiments, controller 102 is a stand-alone component; in others, it is implemented within another module or sub-assembly of vehicle 100 (e.g., a body control module or the like).

In one embodiment, as noted above, the user-actuatable hazard light control component 107 is a turn-signal stalk extending from or otherwise provided on a steering column of vehicle 100. Component 107 might have any number of states, but in one embodiment has a first state (e.g., a 'left' state resulting from the user rotating component 107 counter-clockwise) associated with a first lighting pattern, a second state (e.g., a 'right' state resulting from the user rotating component 107 clockwise) associated with a second lighting pattern, and an inactivated state (or 'centered' state) associated with a default lighting pattern. Under normal driving conditions, component 107 would function as a conventional turn-signal stalk as known in the art, but when controller 102 is activated (e.g., via hazard light activation component 105), component 107 can be used to control the lighting pattern produced by lamps 110. The default lighting pattern may include, for example, the conventional, simultaneously illumination of lamps 100 in a flashing pattern.

Figure 3:
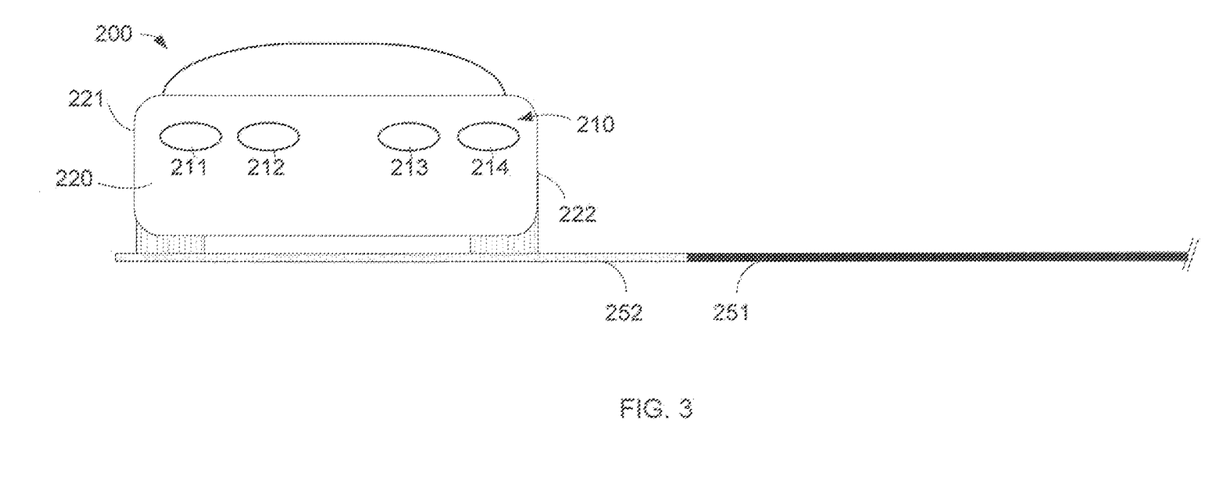

In a particular embodiment, the first lighting pattern includes a leftward illumination sequence relative to the rear portion of the vehicle, i.e., a pattern that indicates to other motorists that they should attempt to change lanes to the left or otherwise bear to the left. Such a scenario is depicted in FIG. 2, which illustrates a vehicle 200 (viewed from the back) stranded on the right shoulder 252 of a roadway 251. Similarly, the second lighting pattern includes a rightward illumination sequence relative to the rear portion of the vehicle to indicate to approaching motorists that they should attempt to change lanes to the right or otherwise bear right. This scenario is illustrated in FIG. 3, which depicts vehicle 200 is stranded on the shoulder 252 a roadway 251.

As illustrated in FIG. 2, the plurality of lamps 210 (i.e., lamps 211-214) may be distributed substantially horizontally from a leftmost lamp 211 adjacent the left side 221 of the rear portion 220 of vehicle 200 to a rightmost lamp 214 adjacent its right side 222. Accordingly, the leftward illumination sequence may include sequentially illuminating the plurality of lamps 210, beginning with the rightmost lamp 214 and ending with the leftmost lamp 211 (i.e., sequential illumination of lamps 214, 213, 212, then 211). Similarly, the rightward illumination sequence might include sequentially illuminating the plurality of lamps 210 beginning with the leftmost lamp 211 and ending with the rightmost lamp 214 (i.e., the sequential illumination of lamps 211, 212, 213, and 214).

Figure 4:
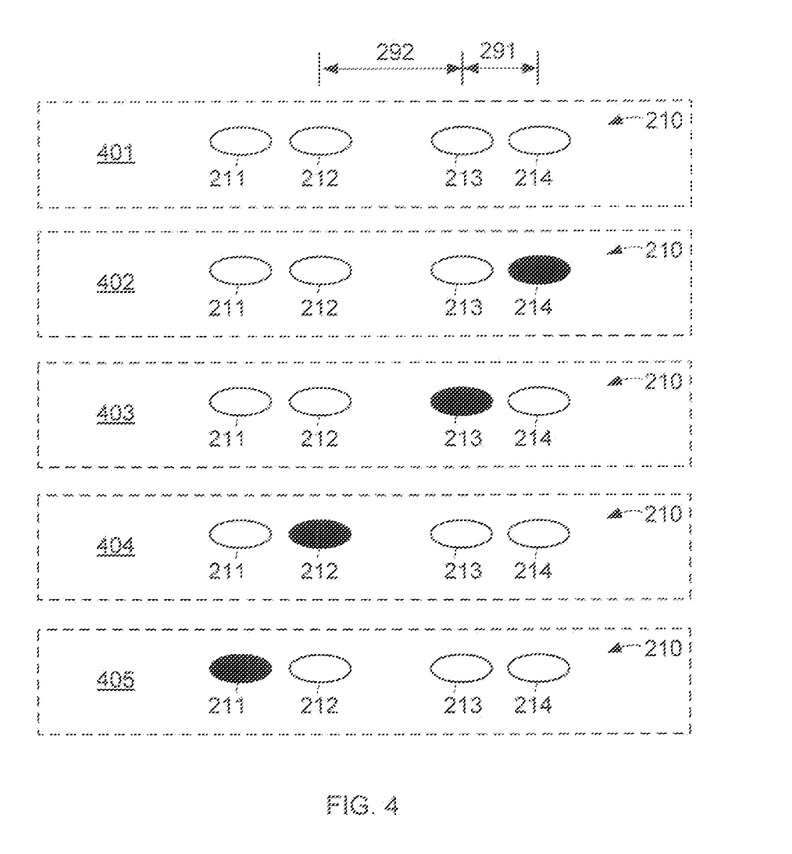
FIGS. 4-6 are conceptual lamp diagrams depicting hazard lighting patterns in accordance with various embodiments.

More particularly, FIG. 4 depicts a leftward illumination sequence (401-405) of lamps 210 in accordance with one embodiment. More particularly, at step 401, none of the lamps 210 are illuminated, subsequently, at steps 402-405, lamps 214, 213, 212, and 211 are sequentially illuminated one by one. The resulting visual effect is one that suggests to approaching drivers to move in the same direction as the propagating illumination—i.e., leftward. Stated another way, a human will perceive an apparent motion of a single lamp propagating from right to left.

Figure 5:
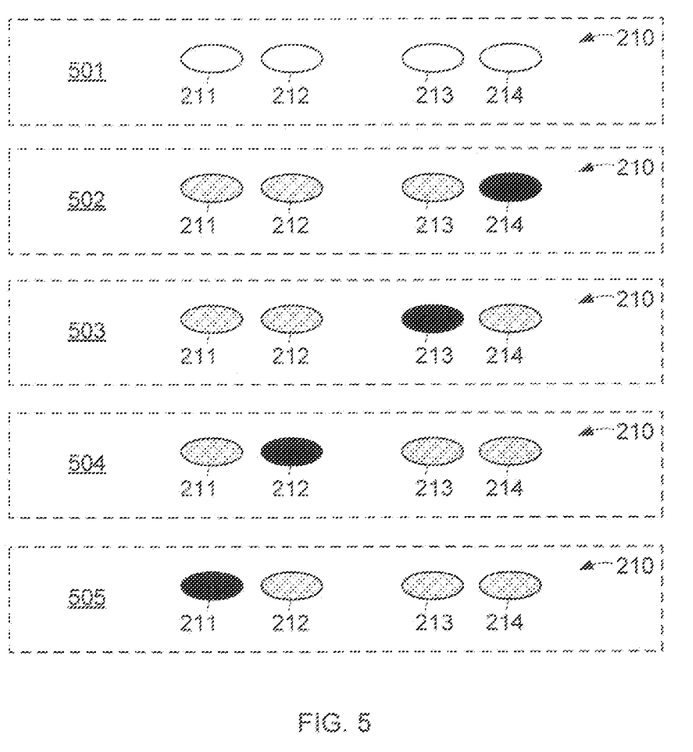

Note that it is not necessary that only one light be illuminated at a particular time. FIG. 5, for example, depicts a leftward illumination sequence (501-505) in accordance with another embodiment in which the leftward illumination sequence further includes partially illuminating substantially all of the plurality of lamps in a flashing pattern while sequentially illuminating the plurality of lamps 210. That is, referring to FIG. 5, initially, at 501, none of the lamps 210 are illuminated. However, subsequently, at steps 502-505, lamps 214, 213, 212, and 211 are each fully illuminated while the remaining lamps (e.g., lamps 211, 212, and 213 at step 502) are only partially illuminating. The visual effect of this pattern is desirable in that it effectively superimposes the traditional flashing lamps (partially illumination) and the leftward lighting sequence.

Figure 6:
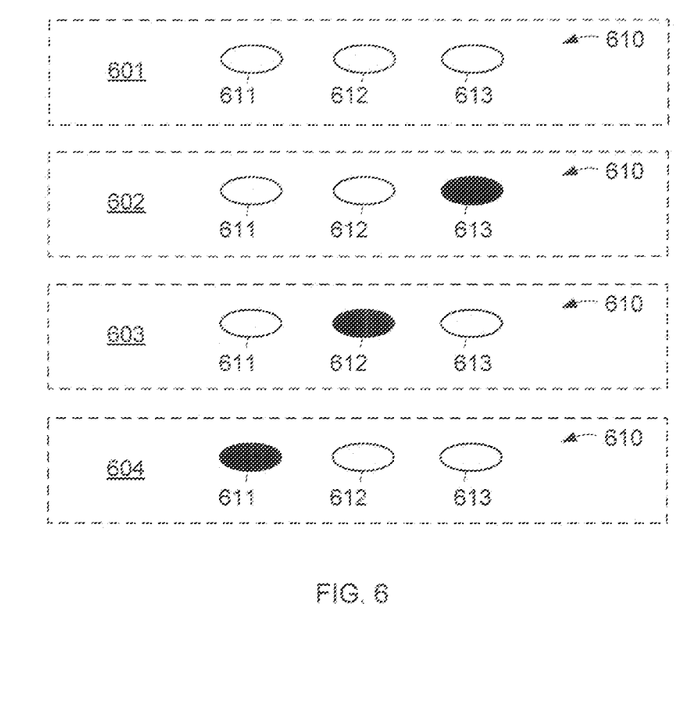

In another embodiment, a central brake lamp may be disposed on the rear portion of the vehicle, and the leftward illumination sequence and the rightward illumination sequence each include selective illumination of the central brake lamp. FIG. 6, for example, depicts a leftward illumination sequence (601-604) in accordance with another embodiment in which lamp 612 is a brake indicator. In the interest of simplicity, lamp 612 is shown as being aligned horizontally with lamps 611 and 613. Those skilled in the art, however, will appreciate that lamp 612 might by higher or lower (e.g., located near the bottom margin of the rear window), depending upon the particular vehicle design. First, at 501, none of the lamps 210 are illuminated, subsequently, at steps 502-505, lamps 214, 213, 212, and 211 are illuminated, respectively.

Referring again to FIG. 4, the timing (e.g., the speed, frequency, gap between illumination, etc.) of lamps 210 may vary depending upon the particular application. For example, the illumination time of lamp 214 at step 402 may be the same as the illumination time of lamp 213 at step 403, and so on. In other embodiments, however, the timing results in overlapping illumination (e.g., two or more lamps 210 illuminated at the same time). Stated another way, in some embodiments lamp 213 is turned 'on' immediately after lamp 214 is turned 'off'. In other embodiments lamp 213 is turned 'on' while lamp 214 is still 'on'. And in another embodiment, lamp 213 is turned 'on' after a predetermined delay time subsequent to lamp 214 turning 'off'.

In a particular embodiment, the leftward illumination sequence (and the rightward illumination sequence) includes sequentially illuminating the plurality of lamps in accordance with an illumination timing that is based on the horizontal spacing of the plurality of lamps. That is, referring to FIG. 4, it will be appreciated that the distance 291 between lamps 213 and 214 is significantly less than the distance 292 between lamps 212 and 213. As a result, if the transition time or delay time between steps 403 and 404 is the same as that between 402 and 403, the "apparent motion" provided by the illuminated lamp will be uneven. That is, the illuminated light appear to "jump" too quickly from lamp 213 to lamp 212. To address this effect, the illumination timing (e.g., how long each lamp 210 is illuminated during any particular portion of the sequence, and delay time between steps) may be based on horizontal spacing of lamps 210. That is, assuming that distance 292 between lamps 212 and 213 is twice that of the distance 291 between lamps 213 and 214, it is desirable for any delay time between illumination of lamps 213 and 212 be twice that of the delay time between illumination of lamps 214 and 213. The resulting visual effect will be one of a light propagating at a constant speed from right to left.

Figure 7:
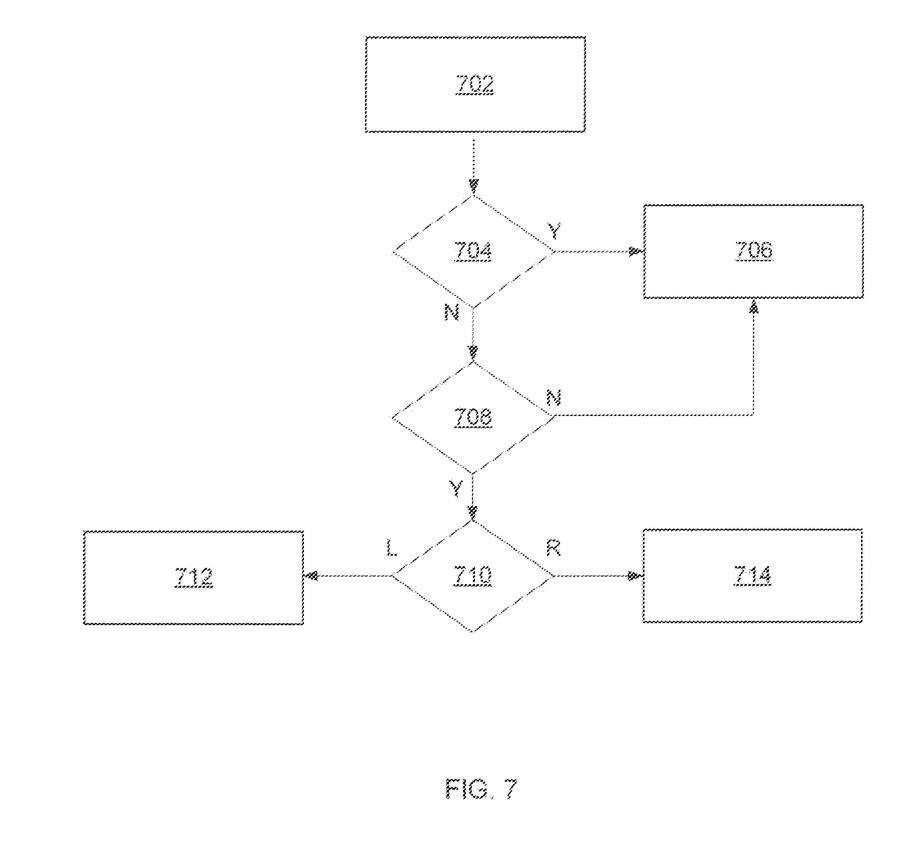
FIG. 7 is a flowchart depicting an exemplary hazard lamp control method in accordance with one embodiment.

FIG. 7 is flowchart of an exemplary hazard control method in accordance with one embodiment, and will be described in conjunction with FIG. 1. Specifically, at step 702, the system receives a hazard activation signal. That is, the system senses, for example, that the user has activated the hazard system by engaging hazard activation switch 105 of FIG. 1.

Next, at step 704, the system determines whether any of the plurality of lamps 110 are not functional (i.e., that at least one of their bulbs has burned out). If not all lamps 110 are functional, the system continues to step 706 and illuminates the plurality of lamps 110 in accordance with the default lighting pattern (e.g., a traditional simultaneous flashing pattern). If, however, the lamps 110 are all functional, the process continues at step 708, and determines whether the user-actuable hazard light control component 107 (e.g., the turn signal stalk) has been activated. If the control component 107 has not been activated, the system proceeds to step 706, and illuminates the plurality of lamps 110 in accordance with the default lighting pattern. That is, this scenario corresponds to the situation in which the driver does not want to engage the advanced functionality of hazard lamp controller 102.

Next, at step 710, the system determines whether control component 107 is in the "L" (left) or "R" (right) state. If in the "L" state (712), a leftward illumination sequence is implemented as described above. Otherwise, in step 714, a rightward illumination sequence is implemented as described above.

Referring again to FIG. 1, controller 102 has been described above without loss of generality in the context of a control component 107, the invention is not so limited. Other manual and automated control components may be employed. For example, in one embodiment a steering angle sensor 109 is used to determine the lighting pattern to use in a particular context. That is, the user might rotate the steering wheel to the left to actuate a leftward propagating pattern, or rotate the steering wheel to the right to actuate a rightward propagating pattern. In another embodiment, a side radar, lidar, or other sensor may be used to observe nearby vehicle motion to determine whether vehicle 100 is parked to the right or to the left of the approaching traffic and select the lighting pattern accordingly. In another embodiment, one or more side cameras 113 are similarly configured to determine the position of vehicle 100 with respect to traffic. In another embodiment, the one or more front or rear cameras can be used independently or together to determine the position of the vehicle 100 with respect to traffic. Finally, a touchscreen display 150 (e.g., part of conventional front console) may be used by the driver to activate and select the desired hazard lighting pattern.

In summary, what has been described are improved systems and methods for controlling hazard lamp lighting patterns (e.g., cascading lights to signal other drivers to move over a particular direction) utilizing a conventional turn-signal stalk or other such user interface component that is already incorporated into most vehicles.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A vehicle comprising:
    a plurality of lamps disposed on a rear portion of the vehicle;
    a hazard light control component having a plurality of states; and
    a hazard lamp controller communicatively coupled to the plurality of lamps, the user-actuable hazard light control component, and the user-actuatable hazard light controller, the hazard lamp controller configured to illuminate the plurality of lamps in accordance with a lighting pattern responsive to the state of the user-actuatable hazard light control component;
    wherein the plurality of lamps are further configured to simultaneously illuminate to indicate that the vehicle is braking;
    wherein the plurality of states includes a first state associated with a first lighting pattern, a second state associated with a second lighting pattern, and an inactivated state associated with a default lighting pattern, the first lighting pattern including a leftward illumination sequence relative to the rear portion of the vehicle, and the second lighting pattern includes a rightward illumination sequence relative to the rear portion of the vehicle; and
    wherein the first state and second state are selected automatically using a sensor configured to determine the position of the vehicle relative to traffic.

2. The vehicle of claim 1, wherein:
    the hazard light control component is a stalk provided on a steering column of the vehicle.

3. The vehicle of claim 2, wherein the stalk is a turn-signal stalk of the vehicle, the first state corresponds to a 'left turn' state of the turn-signal stalk, and the second state corresponds to a 'right turn' state of the turn-signal stalk.

4. The vehicle of claim 2, wherein:
    the plurality of lamps are distributed substantially horizontally from a leftmost lamp of the rear portion of the vehicle to a rightmost lamp of the rear portion of the vehicle;
    the leftward illumination sequence comprises sequentially illuminating the plurality of lamps, beginning with the rightmost lamp and ending with the leftmost lamp;
    the rightward illumination sequence comprises sequentially illuminating the plurality of lamps, beginning with the leftmost lamp and ending with the rightmost lamp.

5. The vehicle of claim 4, wherein the leftward illumination sequence further includes partially illuminating substantially all of the plurality of lamps in a flashing pattern while sequentially illuminating the plurality of lamps.

6. The vehicle of claim 4, wherein the leftward illumination sequence comprises sequentially illuminating the plurality of lamps in accordance with an illumination timing that is based on the horizontal spacing of the plurality of lamps.

7. The vehicle of claim 2, further including a central brake lamp disposed on the rear portion of the vehicle, wherein the leftward illumination sequence and the rightward illumination sequence each include selective illumination of the central brake lamp.

8. The vehicle of claim 1, wherein the default lighting pattern includes simultaneously illuminating the plurality of bulbs in a flashing pattern.

9. The vehicle of claim 1, wherein the hazard lamp controller is configured to determine whether the plurality of lamps are fully functional, and wherein the hazard lamp module is configured to illuminate the plurality of lamps in accordance with the default lighting pattern when the plurality of lamps are not fully functional.

10. A method for controlling hazard lighting for a vehicle, the method comprising:
    receiving a hazard activation signal;
    determining a selected state of a user-actuatable hazard light control component having a plurality of states; and
    illuminating, with a controller, a plurality of lamps disposed on a rear portion of the vehicle in accordance with a lighting pattern responsive to the state of the user-actuatable hazard light control component, wherein the plurality of lamps are further configured to simultaneously illuminate to indicate that the vehicle is braking;
    wherein the plurality of states includes a first state associated with a first lighting pattern, a second state associated with a second lighting pattern, and an inactivated state associated with a default lighting pattern, the first lighting pattern including a leftward illumination sequence relative to the rear portion of the vehicle, and the second lighting pattern includes a rightward illumination sequence relative to the rear portion of the vehicle; and wherein the first state and second state are selected automatically using a sensor configured to determine the location of the vehicle relative to traffic.

11. The method of claim 10, wherein:
the leftward illumination sequence comprises sequentially illuminating the plurality of lamps, beginning with a rightmost lamp and ending with a leftmost lamp;
the rightward illumination sequence comprises sequentially illuminating the plurality of lamps, beginning with the leftmost lamp and ending with the rightmost lamp.

12. The method of claim 10, wherein the leftward illumination sequence further includes partially illuminating substantially all of the plurality of lamps in a flashing pattern while sequentially illuminating the plurality of lamps.

13. The method of claim 10, wherein the leftward illumination sequence comprises sequentially illuminating the plurality of lamps in accordance with an illumination timing that is based on the horizontal spacing of the plurality of lamps.

14. The method of claim 10, wherein the leftward illumination sequence and the rightward illumination sequence each include selective illumination of a central brake lamp of the vehicle.

15. The method of claim 10, wherein the default lighting pattern includes simultaneously illuminating the plurality of bulbs in a flashing pattern.

16. The vehicle of claim 1, further including determining whether the plurality of lamps are fully functional, and illuminating the plurality of lamps in accordance with the default lighting pattern when the plurality of lamps are not fully functional.

17. A hazard lamp controller for a vehicle, the hazard lamp configured to determine a selected state of a turn-signal stalk of the vehicle and to illuminate a plurality of rear lamps of the vehicle in accordance with a lighting pattern responsive to the state of the turn-signal stalk, wherein the rear lamps are further configured to simultaneously illuminate to indicate that the vehicle is braking, the selected state is one of a first state associated with a leftward lighting pattern, a second state associated with a rightward lighting pattern, and an inactivated state associated with a default lighting pattern, wherein the first state and second state are selected automatically using a sensor configured to determine the position of the vehicle relative to traffic.

18. The hazard lamp controller of claim 17, wherein the hazard lamp controller is further configured to illuminate the plurality of lamps in accordance with the default lighting pattern when the plurality of lamps are not fully functional.

* * * * *